United States Patent
Yasuda (10) Patent No.: US 8,930,564 B2
(45) Date of Patent: Jan. 6, 2015

(54) COMMUNICATION RELAY APPARATUS, DATA PROCESSING SYSTEM, AND COMMUNICATION RELAY METHOD

(75) Inventor: Junichi Yasuda, Tokyo (JP)

(73) Assignee: NEC Corporation, Tokyo (JP)

(*) Notice: Subject to any disclaimer, the term of this patent is extended or adjusted under 35 U.S.C. 154(b) by 201 days.

(21) Appl. No.: 13/614,406

(22) Filed: Sep. 13, 2012

(65) Prior Publication Data
US 2013/0080512 A1    Mar. 28, 2013

(30) Foreign Application Priority Data
Sep. 27, 2011   (JP) ................................ 2011-210236

(51) Int. Cl.
G06F 15/16 (2006.01)
H04L 12/66 (2006.01)

(52) U.S. Cl.
CPC ...................................... H04L 12/66 (2013.01)
USPC .......................................... 709/231; 709/232

(58) Field of Classification Search
USPC .......................................... 709/224, 217, 231
See application file for complete search history.

(56) References Cited

U.S. PATENT DOCUMENTS

| | | | |
|---|---|---|---|
| 8,291,231 B2 * | 10/2012 | Ueno et al. ..................... | 713/176 |
| 2008/0235381 A1 * | 9/2008 | Tanizawa et al. ............. | 709/227 |
| 2009/0016339 A1 * | 1/2009 | Tanizawa et al. ............. | 370/389 |
| 2010/0250951 A1 * | 9/2010 | Ueno et al. ..................... | 713/176 |

FOREIGN PATENT DOCUMENTS

JP          2007036389 A         2/2007

* cited by examiner

*Primary Examiner* — Karen Tang
(74) *Attorney, Agent, or Firm* — Sughrue Mion, PLLC (57) ABSTRACT

A communication relay apparatus that relays communication between external network and internal network comprises: judgment unit that receives from terminal on external network communication start message indicative of start of communication to judge whether or not communication start message includes specific application algorithm that requests connection to specific application within internal network; acquisition unit that, if judgment unit judges that communication start message includes specific application algorithm, identifies operation type of specific application based on random number in communication start message, and acquires information about proxy that is set according to identified operation type; proxy unit that controls operation of specific application instead of terminal based on information about proxy acquired by acquisition unit; and transmission unit that inserts specific application algorithm included in communication start message in response message responsive to communication start message, and transmits response message to terminal.

13 Claims, 6 Drawing Sheets

| SETTING INFORMATION | |
|---|---|
| ALGORITHM | BET_TLS_RSA_WITH_NULL_MD5(0xF001)<br>BET_TLS_DHE_DSS_WITH_3DES_EDE_CBC_SHA(0xF012)<br>TLS_RSA_WITH_NULL_MD5(0x0001)<br>TLS_DHE_RSA_WITH_3DES_EDE_CBC_SHA(0x0015)<br>TLS_DHE_DSS_WITH_3DES_EDE_CBC_SHA(0x0012)<br>... |
| SPECIFIC APPLICATION | BEHAVIOR ENGINE |
| CONNECTION CLIENT | BEHAVIOR ENGINE CLIENT 21<br>... |
| CONNECTION SERVER | BEHAVIOR ENGINE SERVER GROUP 300<br>... |
| JUDGING FUNCTION | f1 = PROJECTION FUNCTION F1: BEGINNING 30 BITS<br>f2 = F2: ONE-DIRECTIONAL FUNCTION: ALL BITS |
| RANDOM NUMBER ANALYSIS | f1(r)=y1 → BEHAVIOR ENGINE (SRO) IS CONNECTED<br>... |
| BEHAVIOR TYPE (SRO) | BEHAVIOR ENGINE SERVER (SRO) 31<br>BEHAVIOR ENGINE CLIENT 21<br>BEHAVIOR ENGINE PROXY (SRO) 131 |
| BEHAVIOR ENGINE PROXY (SRO) | EXTERNAL NETWORK: RECONNECTION UP TO 10 TIMES<br>INTERNAL NETWORK: CONNECTION IS MAINTAINED FOR 1 HOUR |

| | SETTING INFORMATION |
|---|---|
| ALGORITHM | BET_TLS_RSA_WITH_NULL_MD5(0xF001)<br>BET_TLS_DHE_DSS_WITH_3DES_EDE_CBC_SHA(0xF012)<br>TLS_RSA_WITH_NULL_MD5(0x0001)<br>TLS_DHE_RSA_WITH_3DES_EDE_CBC_SHA(0x0015)<br>TLS_DHE_DSS_WITH_3DES_EDE_CBC_SHA(0x0012)<br>... |
| SPECIFIC APPLICATION | BEHAVIOR ENGINE |
| CONNECTION CLIENT | BEHAVIOR ENGINE CLIENT 21 |
| CONNECTION SERVER | BEHAVIOR ENGINE SERVER GROUP 300 |
| JUDGING FUNCTION | f1 = PROJECTION FUNCTION F1: BEGINNING 30 BITS<br>f2 = F2: ONE-DIRECTIONAL FUNCTION: ALL BITS |
| RANDOM NUMBER ANALYSIS | f1(r)=y1 → BEHAVIOR ENGINE (SRO) IS CONNECTED<br>... |
| BEHAVIOR TYPE (SRO) | BEHAVIOR ENGINE SERVER (SRO) 31<br>BEHAVIOR ENGINE CLIENT 21<br>BEHAVIOR ENGINE PROXY (SRO) 131 |
| BEHAVIOR ENGINE PROXY (SRO) | EXTERNAL NETWORK: RECONNECTION UP TO 10 TIMES<br>INTERNAL NETWORK: CONNECTION IS MAINTAINED FOR 1 HOUR |

| | SETTING INFORMATION |
|---|---|
| ALGORITHM | BET_TLS_RSA_WITH_NULL_MD5(0xF001)<br>BET_TLS_DHE_DSS_WITH_3DES_EDE_CBC_SHA(0xF012)<br>TLS_RSA_WITH_NULL_MD5(0x0001)<br>TLS_DHE_RSA_WITH_3DES_EDE_CBC_SHA(0x0016)<br>TLS_DHE_DSS_WITH_3DES_EDE_CBC_SHA(0x0012)<br>... |
| SPECIFIC APPLICATION | BEHAVIOR ENGINE |
| CONNECTION CLIENT | BEHAVIOR ENGINE CLIENT 21<br>... |
| CONNECTION SERVER | BEHAVIOR ENGINE SERVER GROUP 300<br>... |
| JUDGING FUNCTION | f1 = PROJECTION FUNCTION F1: BEGINNING 30 BITS<br>f2 = F2: ONE-DIRECTIONAL FUNCTION: ALL BITS |
| RANDOM NUMBER ANALYSIS | $f1(r)=y1$ → BEHAVIOR ENGINE (SRO) IS CONNECTED<br>$f2(r)=y2$ → BEHAVIOR ENGINE (SWO) IS CONNECTED<br>... |
| BEHAVIOR TYPE (SRO) | BEHAVIOR ENGINE SERVER (SRO) 31A<br>BEHAVIOR ENGINE CLIENT 21<br>BEHAVIOR ENGINE PROXY (SRO) 131 |
| BEHAVIOR ENGINE PROXY (SRO) | EXTERNAL NETWORK: RECONNECTION UP TO 10 TIMES<br>INTERNAL NETWORK: CONNECTION IS MAINTAINED FOR 1 HOUR |
| BEHAVIOR TYPE (SWO) | BEHAVIOR ENGINE SERVER (SWO) 31B<br>BEHAVIOR ENGINE CLIENT 21<br>BEHAVIOR ENGINE PROXY (SWO) 132 |
| BEHAVIOR ENGINE PROXY (SWO) | EXTERNAL NETWORK: RECONNECTION UP TO 3 TIMES<br>INTERNAL NETWORK: CONNECTION IS NOT MAINTAINED<br>PRIORITY: HIGH |

COMMUNICATION RELAY APPARATUS, DATA PROCESSING SYSTEM, AND COMMUNICATION RELAY METHOD

REFERENCE TO RELATED APPLICATION

This application claims the benefit of Japanese Patent Application No. 2011-210236 filed on Sep. 27, 2011, the disclosure of which is hereby incorporated by reference herein in its entirety.

The present invention relates to a communication relay apparatus, a data processing system, and a communication relay method.

TECHNICAL FIELD

BACKGROUND

Business processing performed in a company is executed in a data center or a private internal network such as an in-house network, and only terminals within the internal network are permitted to access. In recent years, with the spread of ubiquitous environments, there has been a growing need to execute business processing by accessing a private internal network from an external network using a personal computer or mobile terminal via the Internet.

Patent Literature PTL 1 describes a technology in which a terminal on an external network accesses an internal network via a relay server. According to this technology, the relay server comprises a database that stores a user, who operates a terminal, in association with an application server that executes a role of the user (application). The relay server refers to the database in order to manage a session between a terminal operated by a user and an application server. In this technology, a hand shake processing is performed according to a TLS (Transfer Layer Security) protocol, which makes it possible to access while maintaining security.

[PTL 1] Japanese Patent Kokai Publication No. JP2007-036389A

SUMMARY

The entire disclosures of the above PTL 1 are incorporated herein by reference thereto. The following analysis is given by the present inventor. According to the technology described in PTL 1, the user's role has to be registered in the database in advance. Further, whenever the role is changed, database of the relay server has to be updated.

Therefore, there is a need in the art to provide a communication relay apparatus, a data processing system, and a communication relay method that connect a terminal on an external network to a specific application within an internal network effectively and easily.

According to a first aspect of the present invention, there is provided a communication relay apparatus that relays communication between an external network and an internal network. The apparatus comprises:

a judgment unit that receives from a terminal on the external network a communication start message indicative of start of communication to judge whether or not the communication start message includes a specific application algorithm that requests a connection to a specific application within the internal network;

an acquisition unit that, if the judgment unit judges that the communication start message includes the specific application algorithm, identifies an operation type of the specific application based on a random number in the communication start message, and acquires information about a proxy that is set according to the identified operation type;

a proxy unit that controls an operation of the specific application instead of the terminal based on the information about the proxy acquired by the acquisition unit; and a transmission unit that inserts the specific application algorithm included in the communication start message in a response message responsive to the communication start message, and transmits the response message to the terminal.

According to a second aspect of the present invention, there is provided a data processing system, comprising:

a communication relay apparatus that relays communication between an external network and an internal network; and a terminal on the external network, wherein the communication relay apparatus comprises:

a judgment unit that receives from the terminal a communication start message indicative of start of communication to judge whether or not the communication start message includes a specific application algorithm that requests a connection to a specific application within the internal network;

an acquisition unit that, if the judgment unit judges that the communication start message includes the specific application algorithm, identifies an operation type of the specific application based on a random number in the communication start message, and acquires information about a proxy that is set according to the identified operation type;

a proxy unit that controls an operation of the specific application instead of the terminal based on the information about the proxy acquired by the acquisition unit; and a transmission unit that inserts the specific application algorithm included in the communication start message in a response message responsive to the communication start message, and transmits the response message to the terminal.

According to a third aspect of the present invention, there is provided a communication relay method that relays communication between an external network and an internal network by a computer. The method comprises:

by the computer, receiving from a terminal on the external network a communication start message indicative of start of communication to judge whether or not the communication start message includes an specific application algorithm that requests a connection to a specific application within the internal network;

if the computer judges that the communication start message includes the specific application algorithm, identifying an operation type of the specific application based on a random number in the communication start message, and acquiring information about a proxy that is set according to the identified operation type;

controlling an operation of the specific application instead of the terminal based on the acquired information about the proxy; and inserting the specific application algorithm included in the communication start message in a response message responsive to the communication start message, and transmitting the response message to the terminal.

The present invention provides the following advantage, but not restricted thereto. According to a communication relay apparatus, a data processing system, and a communication relay method in accordance with the present disclosure, a terminal on an external network can be effectively and easily connected to a specific application in an internal network.

PREFERRED MODES

In the present disclosure, there are various possible modes, which include the following, but not restricted thereto. An exemplary embodiment of a communication relay apparatus, a data processing system, and a communication relay method in accordance with the present disclosure will be described below with reference to the accompanying drawings.

First, a configuration of a behavior engine system according to the exemplary embodiment including a gateway apparatus as a communication relay apparatus will be described with reference to FIG. 1. The behavior engine system is a data processing system that executes a specific always-connected application using a plurality of channels. For instance, a behavior engine falls under the specific application. In the present exemplary embodiment, a case in which the specific application is a behavior engine will be described. However, the specific application is not limited to a behavior engine.

A behavior engine is an application that executes data processing according to a behavior type (operation type) set in advance. The behavior type is expressed with attribute information indicating contents of input-output operations of data to be processed. If the data to be processed is, for example, data for sequential read only (it is referred to as "SRO" hereinafter), such data is denoted by "SRO" as a behavior type. If the data to be processed is data for sequential write only (it is referred to as "SWO" hereinafter), such data is denoted by "SWO" as a behavior type. For example, batch business processing such as batch payroll accounting, batch tax accounting falls under the data processing.

Figure 1:
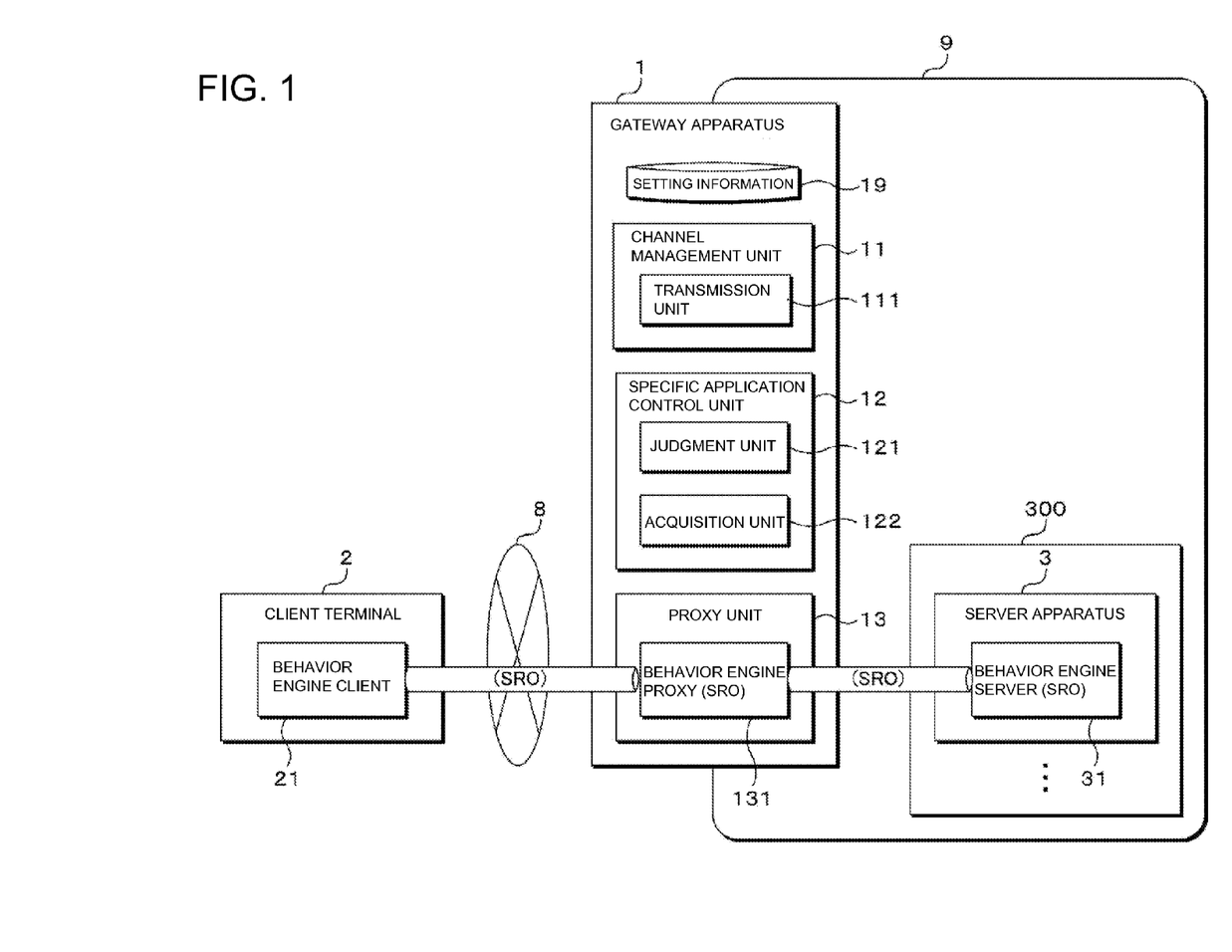
FIG. 1 is a block diagram showing an example of a configuration of a behavior engine system according to an exemplary embodiment.

As shown in FIG. 1, the behavior engine system comprises a client terminal 2, a gateway apparatus 1, and a plurality of server apparatuses 3 that configures a behavior engine server group 300. The server apparatus 3 is disposed on an internal network 9 such as an in-house network. The client terminal 2 is disposed on outside of the internal network 9, and is connected to the gateway apparatus 1 via an external network 8 such as the Internet. The gateway apparatus 1 is disposed at an interface between the external network 8 and the internal network 9, and relays between the external network 8 and the internal network 9.

In the present exemplary embodiment, a case in which the client terminal 2 is connected to an in-house system configured in the internal network 9 is described. However, the connected destination system is not limited to an in-house system. For example, the present disclosure can be applied to a case in which the client terminal 2 is connected to a system that uses a specific application while maintaining security, such as a case in which the client terminal 2 is connected to a data center or a system disposed on a cloud system.

In order to execute a batch processing in the behavior engine system, it is necessary to connect to the behavior engine server group 300 in the internal network 9 and read/write data. In the present exemplary embodiment, a case in which a connection to the gateway apparatus 1 is performed using an SSL (Secure Socket Layer) connection from a behavior engine client 21 of the client terminal 2, and the client terminal 2 is connected to a behavior engine server (SRO) 31 of the server apparatus 3 via a behavior engine proxy (SRO) 131 of the gateway apparatus 1 will be described.

The client terminal 2 includes the behavior engine client 21, and the server apparatus 3 includes the behavior engine server 31. Both the behavior engine client 21 and the behavior engine server 31 execute a behavior engine that is a specific application. It is assumed that the behavior engine server 31 in the present exemplary embodiment is set so as to behave as a behavior engine for SRO. It is assumed that necessary conditions to behave as a behavior engine are set in both the behavior engine client 21 and the behavior engine server 31.

The gateway apparatus 1 has the following functions: checking a connection from the client terminal 2; performing authentication, encryption processing, or the like; performing address conversion, protocol conversion, or the like, if necessary.

The gateway apparatus 1 includes a channel management unit 11, a specific application control unit 12, and a proxy unit 13. The gateway apparatus 1 comprises a setting information table 19 that stores setting information which is referred to or updated by the above-mentioned each unit.

Figure 2:
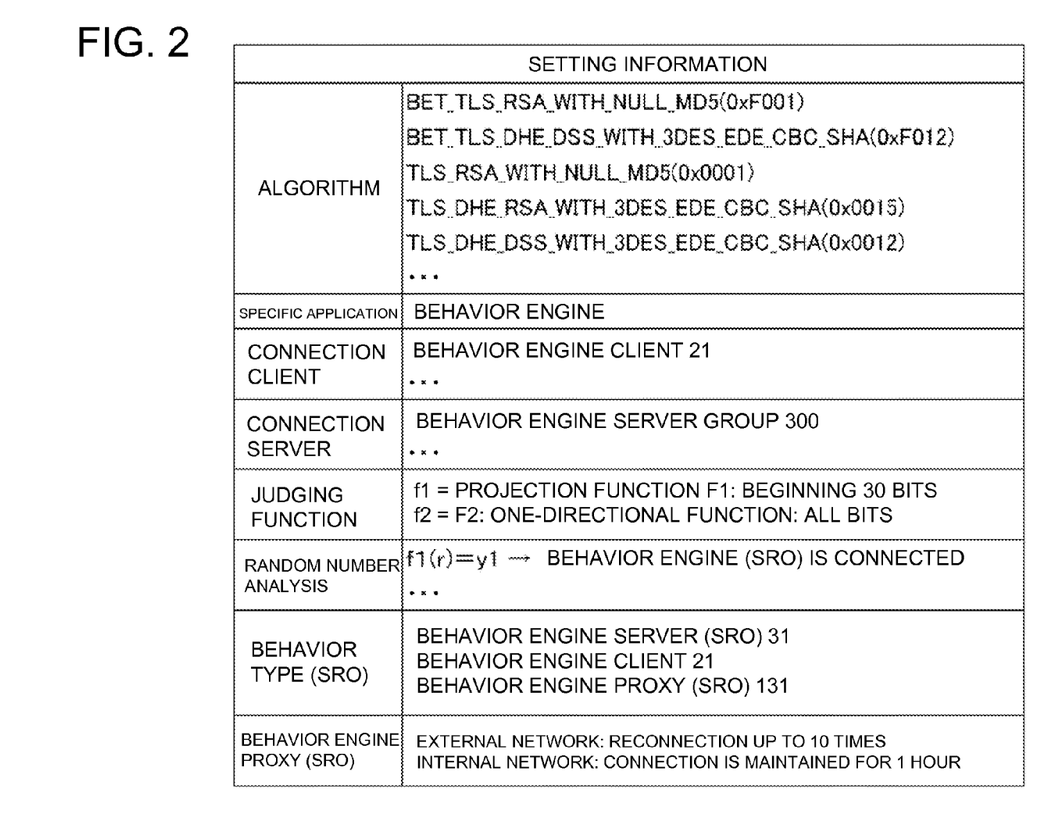
FIG. 2 is a figure showing, as an example, setting information stored in a setting information table accordance to the exemplary embodiment.

FIG. 2 shows, as an example, setting information stored in a setting information table 19. For instance, the setting information includes information about an algorithm, a specific application, a connection client, a connection server, a judging function, a random number analysis, behavior type (SRO), behavior engine proxy (SRO), or the like.

The channel management unit 11 manages a channel connected between the external network 8 and the internal network 9. The channel management unit 11 has a function as a general gateway, and manages session information of the channel, IP (Internet Protocol) address, or the like.

The specific application control unit 12 controls a behavior engine that is a specific application. The specific application control unit 12 exchanges information with the behavior engine server group 300 and the behavior engine client 21 to read/write the information to the setting information table 19. The specific application control unit 12 generates/deletes the behavior engine proxy 31, or changes the setting of the behavior engine proxy 31 by controlling the proxy unit 13.

The specific application control unit 12 comprises a judgment unit 121 and an acquisition unit 122.

When a communication start message is received from the client terminal 2, the judgment unit 121 judges whether or not the communication start message includes a behavior engine algorithm that requests a connection to the behavior engine within the internal network 9.

If the judgment unit 121 judges that the communication start message includes a behavior engine algorithm, the acquisition unit 122 identifies a behavior type of the behavior engine based on a random number included in the communication start message, and acquires information about the behavior engine proxy set in association with the identified behavior type.

The channel management unit 11 comprises a transmission unit 111. The transmission unit 111 inserts the behavior engine algorithm included in the communication start message in a response message that is responded to the communication start message received from the client terminal 2, and transmits the response message to the client terminal 2.

The proxy unit 13 comprises a behavior engine proxy 131.

The behavior engine proxy 131 controls an operation of the behavior engine instead of the client terminal 2 based on the information about the behavior engine proxy acquired by the acquisition unit 122.

The behavior engine proxy 131 has functions of proxy for the behavior engine client 21 and the behavior engine server 31 and transfers data. The behavior engine proxy 131 has functions of transferring/holding data, reconnecting the channel, or the like based on the state of the connection to the behavior engine client 21 and the behavior engine server 31. The behavior engine proxy 131 can set and change the state of the connection of the channel arbitrarily based on the characteristics of the specific application, for example, even if the behavior engine proxy 131 is disconnected from the external network 8, the connection in the internal network 9 is maintained for a certain period of time. The behavior engine proxy 131 in the exemplary embodiment operates as a proxy that processes a behavior type SRO.

Figure 3:
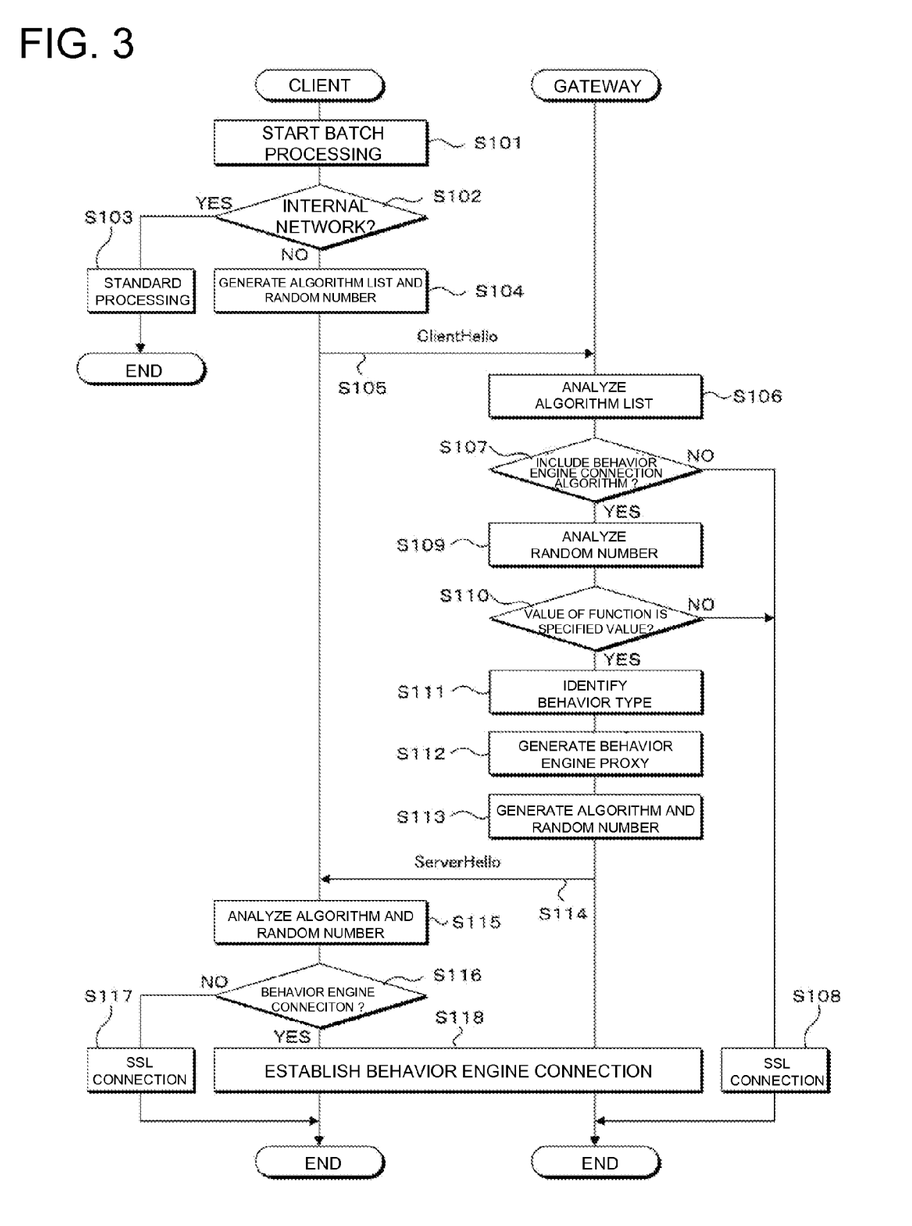
FIG. 3 is a flow chart explaining an operation of the behavior engine system.

Next, an operation of the behavior engine system will be described with reference to FIG. 3. This operation example shows a case where the client terminal 2 connects to the gateway apparatus 1 using an SSL connection, and connects to the behavior engine server (SRO) 31 via the behavior engine proxy (SRO) 131.

First, the behavior engine client 21 of the client terminal 2 tries to connect to the behavior engine server group 300 in order to start a batch processing (step S101).

Next, the behavior engine client 21 judges whether or not the terminal itself 2 exists in the internal network 9 (step S102). If the judgment is YES (step S102; YES), a connection processing as a standard behavior engine is performed, and a standard processing performed when the terminal 2 exists in the internal network 9 is executed (step S103). Then, the operation is finished.

On the other hand, if it is judged in step S102 that the terminal 2 does not exist in the internal network 9 (step S102; NO), the behavior engine client 21 generates an algorithm list for a behavior engine and a random number (step S104).

Here, in the algorithm list for the behavior engine, a behavior engine connection algorithm is appended other than an algorithm generated by a hand-shake of the SSL. A random number with 32 bytes is generated in the same way as a random number generated by the hand-shake of the SSL.

For instance, a behavior engine connection algorithm can be denoted by a notation indicating a behavior engine type (e.g., "BET (Behavior Engine Type)")+an algorithm name of the SSL (e.g., "TLS_RSA_WITH_NULL_MD5"). Among algorithms of setting information shown in FIG. 2, "BET_TLS_RSA_WITH_NULL_MD5(0xF001)" and "BET_TLS_DHE_DSS_WITH_3DES_EDE_CBC_SHA (0xF012)" correspond to algorithms for behavior engine connection. "BET_TLS_RSA_WITH_NULL_MD5(0xF001)" indicates that a specific application of the connected destination is a behavior engine, and an authentication and an encryption of the SSL is performed by "TLS_RSA_WITH_NULL_MD5."

For instance, the random number can be generated by the following procedures (1)-(5). (1) A random number "ra" is temporarily generated. (2) "y" is calculated by substituting the temporal random number "ra" into "f(r)=y" that is set as a judging function in the setting information. (3) It is checked whether or not the value of "y" (or part of "y") matches a predetermined value set as random number analysis in the setting information. (4) If the value of "y" (or part of "y") does not match the predetermined value, the procedures (1)-(4) are repeated. (5) If the value of "y" (or part of "y") matches the predetermined value, the value "ra" is used for the random number.

In the present operation example, it is assumed that a projection function "f1(r)" is set as the above judging function "f(r)." It is assumed that the projection function "f1(r)" is a function that outputs "y0 (0x00)" or "y1 (=0x01)" from a given random number. If the output value of the projection function "f1(r)" is "y1 (=0x01)," it indicates that the behavior type is "SRO."

Meanwhile, a function that transforms any value into a value with different dimension such as a projection function or a one-directional function can be used as a judging function. And an eigen function that defines an eigen value of any vector can be used as a judging function. Further, a divergence/convergence when expanding a function at the neighborhood of any singular point may be used for the judgment. However, it is assumed that the same judging function and judging method are set in both the client terminal 2 and the gateway apparatus 1.

Since the behavior type is "SRO" in the present operation example, it is assumed that a random number "r1" is generated as the above random number so that "f1(r1)=y1 (=0x01)" is satisfied. The beginning 4 bytes among 32 byte that configures the random number may be used for a region to store time information. Meanwhile, the predetermined value may be directly embedded in the random number.

Next, the behavior engine client 21 transmits to the gateway apparatus 1 ClientHello (communication start message), in which the algorithm list and the random number generated in step S104 are inserted (step S105). In this way, a handshake processing of the SSL is started.

Next, the judgment unit 121 of the gateway apparatus 1 analyzes the algorithm list included in the ClientHello (step S106), and judges whether or not a behavior engine connection algorithm is included (step S107). If the judgment is NO (step S107; NO), the channel management unit 11 executes a standard SSL connection processing (step S108). Then, the present operation is finished.

On the other hand, if it is judged in step S107 that a behavior engine connection algorithm is included (step S107; YES), the acquisition unit 122 of the gateway apparatus 1 analyzes a random number included in the ClientHello (step S109), and judges whether or not a value of the judging function "f1(r)" is equal to the predetermined value (step S110). If the judgment is NO (step S110; NO), the channel management unit 11 executes a standard SSL connection processing (step S108), and then the present operation is finished.

On the other hand, if it is judged in step S110 that the value of the judging function "f1(r)" is equal to the predetermined value (step S110; YES), the acquisition unit 122 identifies a behavior type based on the predetermined value (step S111). Since the value of the judging function "f1(r)" is "y1 (=0x01)" in the present operation example, the behavior type is "SRO."

Next, the specific application control unit 12 of the gateway apparatus 1 generates a behavior engine proxy based on behavior engine proxy information corresponding to the identified behavior type (step S112). Since the behavior type is "SRO" in the present operation example, a behavior engine proxy (SRO) 131 is generated, and connected to the behavior engine server (SRO) 31.

Next, the specific application control unit 12 of the gateway apparatus 1 selects a behavior engine connection algorithm among an algorithm list included in the ClientHello, generates the algorithm, and also generates a random value (step S113). The random number is generated so that the value of the judging function "f1(r)" indicates a specific behavior type. Since the behavior type is "SRO" in the present operation example, a random number "r1" is generated so that the value of judging function "f1(r)" is "y1 (=0x01).

Next, the transmission unit 111 of the gateway apparatus 1 generates ServerHello in which the algorithm and the random number generated in step S113, and server certification are inserted, and transmits the ServerHello to the behavior engine client 21 (step S114).

Next, the behavior engine client 21 analyzes the algorithm and the random number included in the ServerHello (step S115).

Next, the behavior engine client 21 confirms whether or not the algorithm included in the ServerHello is a behavior engine connection algorithm, and also confirms whether or not the value of the judging function indicates a behavior type by substituting the random number into the judging function "f1(r)," so that the behavior engine client 21 judges whether or not the algorithm is for a behavior engine connection. If the judgment is NO (step S116; NO), the behavior engine client 21 executes a standard SSL connection processing (step S117), and then the present operation is finished.

On the other hand, if it is judged in step S116 that it is a behavior engine connection (step S116; YES), the behavior engine client 21 establishes a behavior engine connection between the behavior engine client 21 and the behavior engine server (SRO) 31 via the behavior engine proxy (SRO) 131 (step S118). In this way, data exchange is started between the behavior engine client 21 and the behavior engine server 31.

Figure 4:
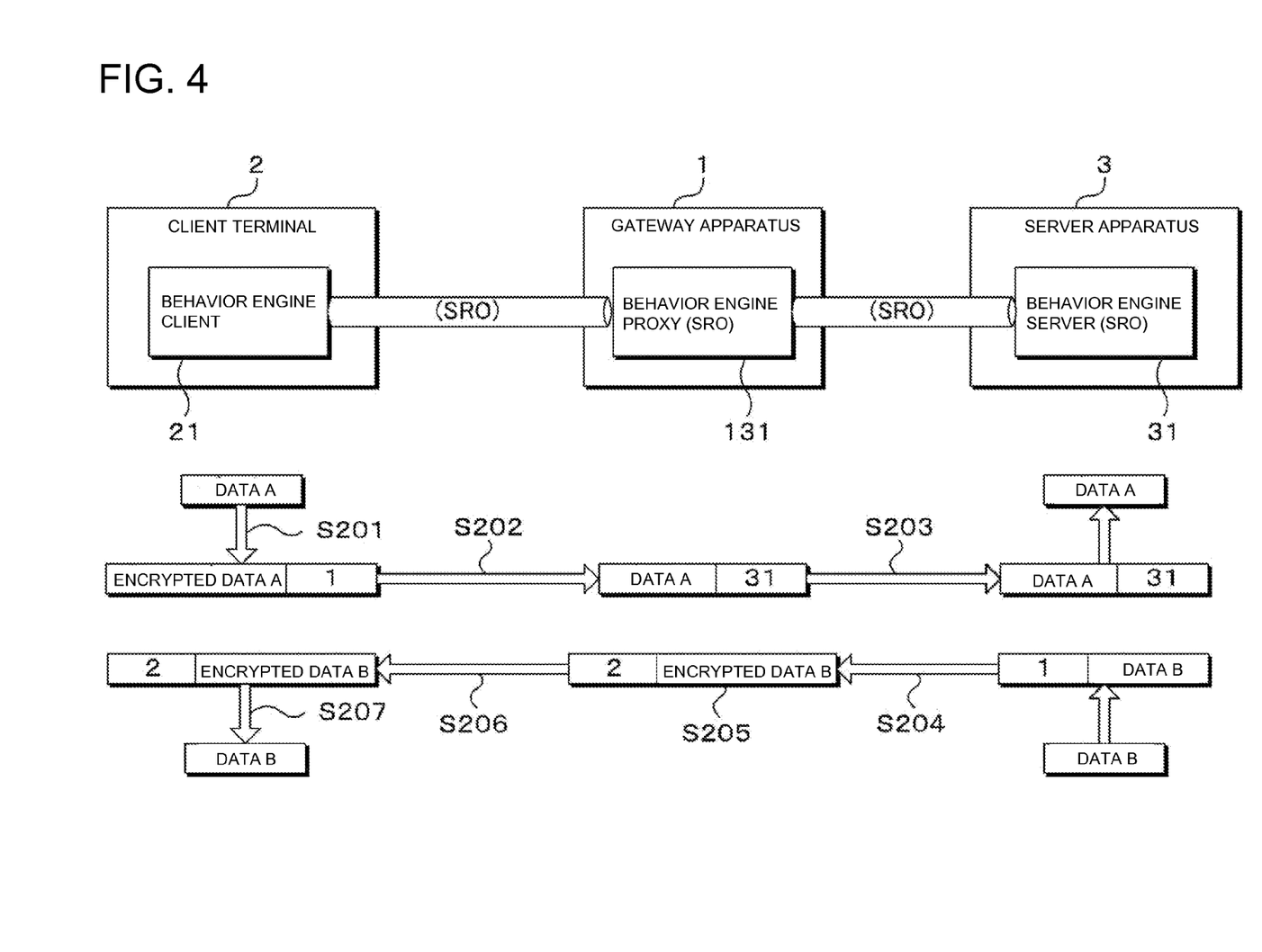
FIG. 4 is a figure showing an example of data exchange when connecting to the behavior engine.

The contents of the exchange performed between the behavior engine client 21 and the behavior engine server 31 that are connected by a behavior engine connection will be described with reference to FIG. 4. Here, since the behavior engine proxy (SRO) 131 identifies that a behavior type is "SRO" in step S111, the behavior engine proxy (SRO) 131 acknowledges that the channel between the behavior engine client 21 and the behavior engine server (SRO) 31 is a channel of SRO when connecting as a behavior engine connection.

First, the behavior engine client 21 directly encrypts "data A" without encapsulating (without adopting an SSL tunnel connection) to generate "encrypted data A" (step S201). Next, the behavior engine client 21 transmits "encrypted data A" to the behavior engine proxy (SRO) 131 (step S202). Next, the behavior engine proxy (SRO) 131 decrypts "encrypted data A" into "data A," and directly transmits the "data A" to the behavior engine server 31 (step S203). The behavior engine server 31 acquires "data A" from the behavior engine client 21 in this way.

Since it is only necessary that the behavior engine proxy decrypts "encrypted data A" and directly transfers "data A" to the behavior engine server 31 as described above, it is not necessary that an application is specified by checking the contents of data as in an SSL connection. Since the behavior engine proxy knows a transfer destination in advance, comparing to an SSL connection in which a connection between a gateway apparatus and a server apparatus is started after being in a data transfer phase, less amount of processing is needed in the gateway apparatus 1, so that data transfer becomes fast.

On the other hand, if the behavior engine server 31 transfers "data B" to the behavior engine proxy (SRO) 131 (step S204), the behavior engine proxy (SRO) 131 encrypts "data B" to generate "encrypted data B" (step S205). Next, the behavior engine proxy (SRO) 131 transfers "encrypted data B" to the behavior engine client (step S206). Next, the behavior engine client 21 decrypts "encrypted data B" to acquire the "data B" (step S207).

As described above, according to a behavior engine system of the exemplary embodiment, since information about a behavior engine is inserted in the ClientHello, it is possible to acknowledge at the stage of a hand-shake of the SSL as to what type of processing is performed. Thus, a preparation for the behavior engine connection, or a channel setting to the behavior engine server can be progressed in advance, which makes it possible that a connection from the client terminal 2 disposed on the external is performed fast.

According to a behavior engine system of the exemplary embodiment, since a connection between the external apparatus and the internal apparatus can be optimized for each engine, a reconnection can be executed fast. For instance, as setting information about a behavior engine proxy, it is possible to register a setting in which the connection between the behavior engine proxy and the behavior engine server is maintained when a connection between the client terminal and the behavior engine proxy is disconnected. In this case, if the client terminal tries to reconnect to the behavior engine proxy, the connection between the client terminal and the behavior engine server can be performed fast.

Since the behavior engine system in the exemplary embodiment can be realized by using only SSL parameters as parameters used for the connection, a possibility of being discarded by a network device such as firewall can be reduced. Thus, connectivity from external to internal can be improved. Since information about a behavior engine is inserted into parameters, a possibility of being seen through by the other person can be reduced.

(Variation)

Meanwhile, the above-mentioned exemplary embodiment is merely an example, and various variations and adaptation of the technology, which are not disclosed clearly in the exemplary embodiment, are not excluded. Namely, the present invention may be varied in various embodiments without departing the gist, and carried out.

Figure 5:
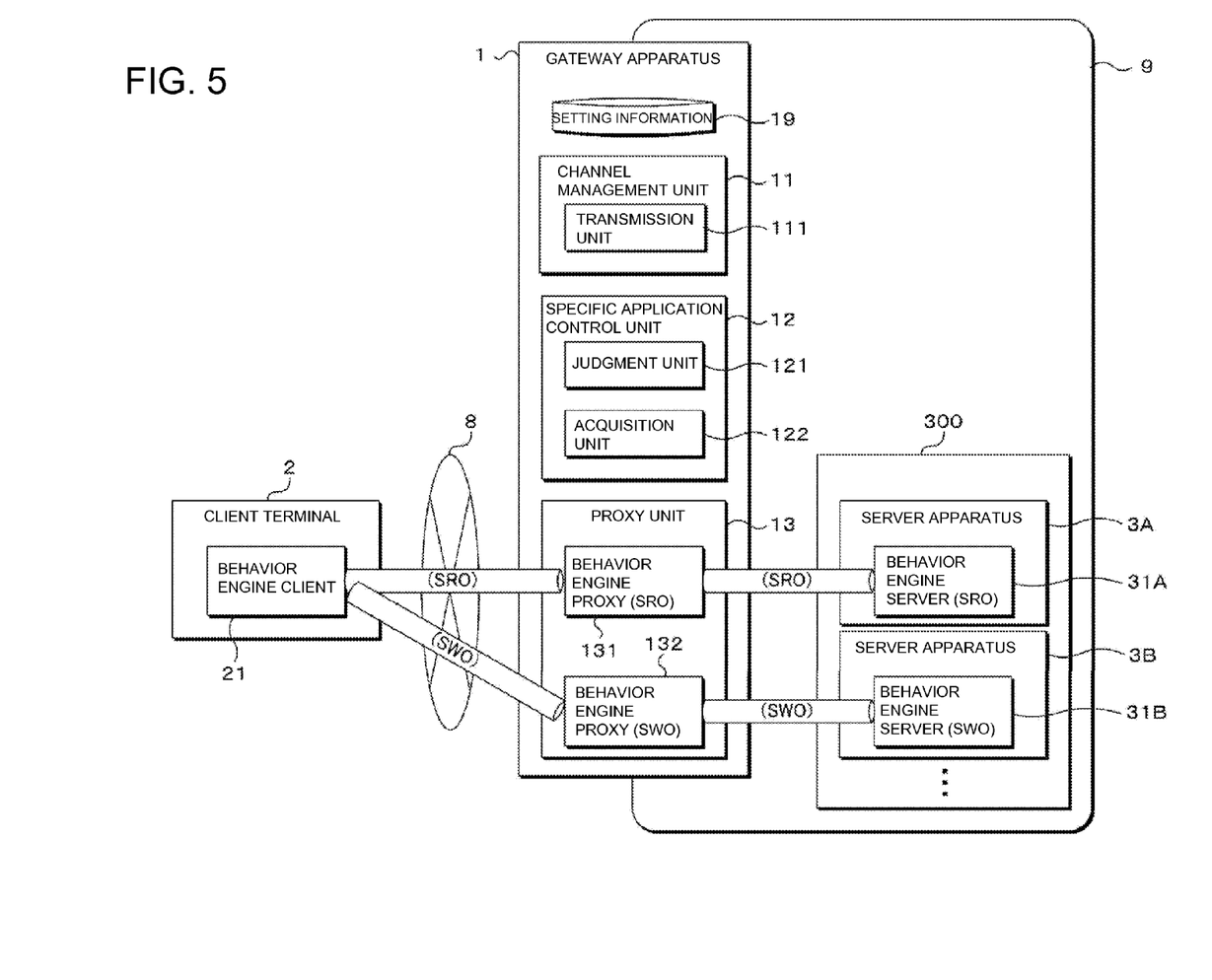
FIG. 5 is a block diagram showing an example of a configuration of a behavior engine system according to a variation of the exemplary embodiment.
Figure 6:
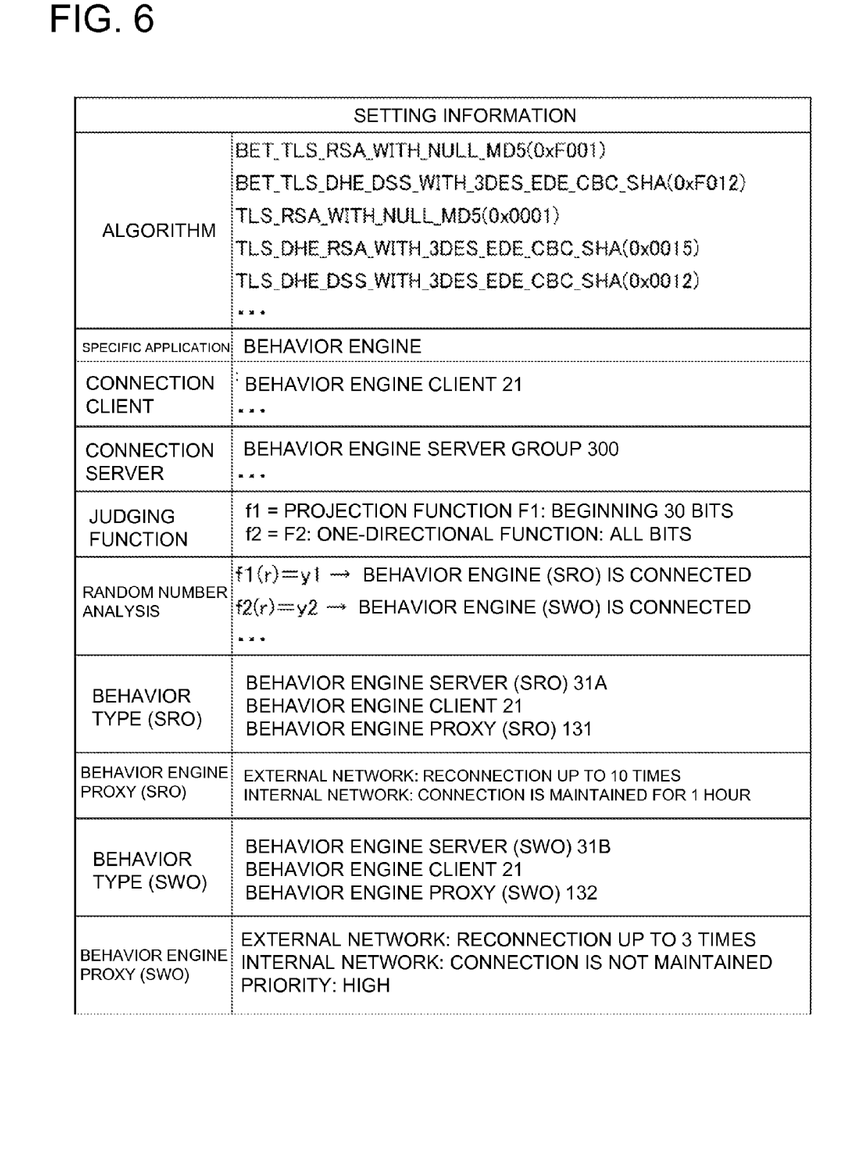
FIG. 6 is a figure showing an example of setting information stored in a setting information table according to the variation of the exemplary embodiment.

For instance, in the exemplary embodiment described above, a case where a behavior engine as a specific application uses a single channel is described. However, it is also possible to apply the present invention to a case where the behavior engine uses a plurality of channels. A case where a behavior engine uses two channels will be described with reference to FIG. 5 and FIG. 6. FIG. 5 is a figure showing, as an example, a setting of a behavior engine system. FIG. 6 is a figure showing, as an example, setting information stored in setting information table 19. Only different points from the above-mentioned case where a single channel is used will be described below.

As shown in FIG. 5, behavior engine server group 300 comprises a server apparatus 3A including a behavior engine server (SRO) 31 A, and a server apparatus 3B including a behavior engine server (SWO) 31B. As shown in FIG. 6, "SRO" and "SWO" are set as behavior type information. And it is set that the behavior engine server (SRO) 31A is behaved as an SRO engine, and the behavior engine server (SWO) 31B is behaved as an SWO engine. And a behavior engine proxy (SWO) 132 is set as a proxy connected to the behavior engine server (SWO) 31B, and "f2(r)" is set as a judging function which the behavior engine proxy (SWO) 132 uses. Furthermore, priority of connection for SWO is set to be high.

In the exemplary embodiment mentioned above, the behavior engine client 21 analyzes a random number included in ServerHello, however, it is not always necessary to analyze the random number. If the random number is not analyzed, the random number generated in the gateway apparatus 1 may be a mere random number. In this case, the behavior engine client 21 judges whether or not it is a behavior engine connection based on the analysis result for algorithms included in the received ServerHello.

In the behavior engine system of the exemplary embodiment mentioned above, when the behavior engine proxy is connected to the behavior engine server, a synchronous connection may is possible, and an asynchronous connection may be also possible. If a synchronous connection is performed, for example, after a connection between the behavior engine proxy and the behavior engine server is confirmed, processing is proceeded. If they cannot be connected, an error is returned, and the processing is proceeded by a standard SSL connection. On the other hand, if an asynchronous connection is performed, for example, the processing is proceeded in spite of the state of the connection between the behavior engine proxy and the behavior engine server.

Meanwhile, the disclosure of the above Patent Literature is incorporated herein in its entirety by reference thereto. The exemplary embodiments and examples may include variations and modifications without departing the gist and scope of the present invention as disclosed herein and claimed as appended herewith, and furthermore based on the fundamental technical spirit. It should be noted that any combination and/or selection of the disclosed elements (including elements of each of the claims, elements of each of the exemplary embodiments, elements of each of the drawings) may fall within the claims of the present invention. That is, it should be noted that the present invention of course includes various variations and modifications that could be made by those skilled in the art according to the overall disclosures including claims, and technical spirit.

What is claimed is:

1. A communication relay apparatus that relays communication between an external network and an internal network, the apparatus comprising:
    a judgment unit, implemented by at least one hardware processor, that receives from a terminal on the external network a communication start message indicative of start of communication to judge whether or not the communication start message includes a specific application algorithm that requests a connection to a specific application within the internal network;
    an acquisition unit, implemented by said at least one hardware processor, that, if the judgment unit judges that the communication start message includes the specific application algorithm, identifies an operation type of the specific application based on a random number in the communication start message, and acquires information about a proxy that is set according to the identified operation type;
    a proxy unit, implemented by said at least one hardware processor, that controls an operation of the specific application instead of the terminal based on the information about the proxy acquired by the acquisition unit; and
    a transmission unit, implemented by said at least one hardware processor, that inserts the specific application algorithm included in the communication start message in a response message responsive to the communication start message, and transmits the response message to the terminal.

2. The communication relay apparatus according to claim 1, wherein
    the specific application is a behavior engine that performs a data processing according to the operation type set in advance.

3. The communication relay apparatus according to claim 2, wherein
    the operation set in advance is a sequential read or sequential write of data to be processed.

4. A data processing system, comprising:
    a communication relay apparatus that relays communication between an external network and an internal network; and
    a terminal on the external network, wherein
    the communication relay apparatus comprises:
    a judgment unit, implemented by at least one hardware processor, that receives from the terminal a communication start message indicative of start of communication to judge whether or not the communication start message includes a specific application algorithm that requests a connection to a specific application within the internal network;
    an acquisition unit, implemented said at least one hardware processor, that, if the judgment unit judges that the communication start message includes the specific application algorithm, identifies an operation type of the specific application based on a random number in the communication start message, and acquires information about a proxy that is set according to the identified operation type;
    a proxy unit, implemented by said at least one hardware processor, that controls an operation of the specific application instead of the terminal based on the information about the proxy acquired by the acquisition unit; and
    a transmission unit, implemented by said at least ne hardware processor that inserts the specific application algorithm included in the communication start message in a response message responsive to the communication start message, and transmits the response message to the terminal.

5. The data processing system according to claim 4, wherein
    the specific application is a behavior engine that performs a data processing according to the operation type set in advance.

6. The data processing system according to claim 5, wherein
    the operation set in advance is a sequential read or sequential write of data to be processed.

7. The data processing system according to claim 4, wherein
    the terminal generates an algorithm list that includes the specific application algorithm and a random number that identifies the operation type of the specific application, inserts the generated algorithm list and the random number in the communication start message, and transmits the communication start message to the communication relay apparatus.

8. The data processing system according to claim 4, wherein,
    if the response message received from the communication relay apparatus includes the specific application algorithm, the terminal starts communication with the specific application according to the operation type via the communication relay apparatus.

9. A communication relay method that relays communication between an external network and an internal network by a computer, the method comprising:

by the computer, receiving from a terminal on the external network a communication start message indicative of start of communication to judge whether or not the communication start message includes an specific application algorithm that requests a connection to a specific application within the internal network;

if the computer judges that the communication start message includes the specific application algorithm, identifying an operation type of the specific application based on a random number in the communication start message, and acquiring information about a proxy that is set according to the identified operation type;

controlling an operation of the specific application instead of the terminal based on the acquired information about the proxy; and inserting the specific application algorithm included in the communication start message in a response message responsive to the communication start message, and transmitting the response message to the terminal.

10. The communication relay method according to claim 9, wherein
the specific application is a behavior engine that performs a data processing according to the operation type set in advance.

11. The communication relay method according to claim 10, wherein
the operation set in advance is a sequential read or sequential write of date to be processed.

12. The communication relay method according to claim 9, comprising:
by the terminal, generating an algorithm list that includes the specific application algorithm and a random number that identifies the operation type of the specific application; and
inserting the generated algorithm list and the random number in the communication start message and transmitting the communication start message to the communication relay apparatus.

13. The communication relay method according to claim 9, comprising:
by the terminal, if the response message received from the communication relay apparatus includes the specific application algorithm, starting communication with the specific application according to the operation type via the communication relay apparatus.

* * * * *